United States Patent [19]

Collins

[11] Patent Number: 4,479,656
[45] Date of Patent: Oct. 30, 1984

[54] MEANS FOR SEALING A GAP AROUND A CONDUCTOR PIPE IN AN OFFSHORE OIL PLATFORM

[75] Inventor: Michael H. Collins, Chester, England

[73] Assignee: Shell Internationale Research Maatschappij B. V., The Hague, Netherlands

[21] Appl. No.: 433,521

[22] Filed: Oct. 8, 1982

[30] Foreign Application Priority Data

Oct. 20, 1981 [GB] United Kingdom ................ 8131591

[51] Int. Cl.³ .......................... F16J 15/44; F16J 15/40
[52] U.S. Cl. ....................................... 277/135; 277/56; 277/DIG. 6; 166/345; 166/355
[58] Field of Search .................. 277/13, 14 R, 14 V, 277/135, 53–57, 12, 32, DIG. 6; 220/228, 359; 166/355, 368, 345

[56] References Cited

U.S. PATENT DOCUMENTS

| 725,937 | 4/1903 | Craig | 277/135 |
|---|---|---|---|
| 2,036,309 | 4/1936 | Wells | 277/14 V X |
| 2,166,405 | 7/1939 | Hait | 277/135 X |
| 2,215,449 | 9/1940 | Alexander et al. | 277/135 X |
| 2,954,244 | 9/1960 | Austin | 277/135 |
| 2,982,417 | 5/1961 | Durrell | 277/135 X |
| 3,193,131 | 7/1965 | Smith | 220/228 |
| 3,354,792 | 11/1967 | Fuchs | 277/135 X |
| 3,551,005 | 12/1970 | Brun | 277/135 X |
| 3,825,148 | 7/1974 | Hunter et al. | 220/359 |
| 3,910,041 | 10/1975 | Gibson | 277/135 X |
| 4,103,902 | 8/1978 | Steiner et al. | 277/56 X |
| 4,304,413 | 12/1981 | Champagne et al. | 277/135 |

FOREIGN PATENT DOCUMENTS

| 535068 | 2/1955 | Belgium | 220/228 |
|---|---|---|---|
| 1244189 | 9/1960 | France | 220/228 |
| 129569 | 7/1919 | United Kingdom | 220/228 |
| 1233487 | 5/1971 | United Kingdom | 277/135 |
| 2017831 | 10/1979 | United Kingdom | 277/3 |
| 2042100 | 9/1980 | United Kingdom | 277/135 |

Primary Examiner—Robert S. Ward
Attorney, Agent, or Firm—Pravel, Gambrell, Hewitt & Kimball

[57] ABSTRACT

Conductor pipes on an offshore drilling and production platform pass through openings in the decks of the platform. The openings are to be sealed off to prevent spreading of hot and/or noxious fluids from one deck to another. The sealing means consists of two annular elements arranged around a conductor and connected to the conductor and the deck, respectively, thereby forming an annular trough in which one of the elements protrudes. The trough is filled with a flexible substance, such as a silicone foam.

19 Claims, 4 Drawing Figures

MEANS FOR SEALING A GAP AROUND A CONDUCTOR PIPE IN AN OFFSHORE OIL PLATFORM

The invention relates to means for sealing the gap around a conductor pipe at the location where said pipe passes through a deck portion of an offshore platform.

Offshore platforms are used in those areas where bodies of water overly underground formations containing hydrocarbons such as crude oil and/or gas. The platforms consist of one or more decks supported by a structure, which structure may be a concrete body, a steel open frame work, or be formed by steel or concrete legs resting on the bottom of the body of water. Large diameter pipes (also indicated by the expression "conductors" or "conductor pipes") are arranged between a deck and a level below the bottom of the body water, and drilling equipment such as a drill string including drill collars, a drilling bit and optionally a downhole motor (such as a hydraulic turbine) is lowered through the conductor pipe and activated to drill a hole in the bottom of the body of water. If oil (or gas) containing formations are reached by the drilling equipment, a well is completed in the conductor pipe and the hole, and oil (or gas) production from the formation is started.

The conductor pipes are large-diameter pipes (about 30" in diameter), and are supported from a deck of the platform, and pass through openings in the deck, as well as through openings arranged in the decks that are situated at levels lower than the level of the first deck.

It is in the interest of safety to seal the gaps around a conductor pipe where said pipe passes through the deck portions. The seals used for this purpose should prevent the passage of liquids and/or gases through the gaps, and in particular prevent the free flow of flammable or noxious gases through these gaps in the event of leakage of such gases from an uncontrolled gas source.

Earlier attempts to seal such gaps on offshore platforms were not successful, in particular as a result of the movements that occur between the conductors and the deck portions.

An object of the present invention is to provide a cheap and reliable seal for sealing a gap around a conductor where said conductor passes through a deck portion, which seal will be resistant against loads exerted thereon by movement of the conductor relative to the platform.

Another object of the invention is to provide a means for sealing a gap around a conductor pipe where said pipe passes through a deck portion of an offshore platform, which seal can be placed in a simple manner by personnel without requiring an extensive preliminary training.

According to the present invention, the means for sealing a gap around a conductor pipe at a location where said pipe passes through a deck portion of an offshore platform includes a first and a second annular element arranged around the conductor pipe and connected to the conductor pipe and the deck portion, respectively, one of the annular elements forming at least part of the wall of an annular trough with an open upper end, and the other annular element being arranged to protrude partly into the trough, the trough being filled with a flexible substance.

A suitable flexible substance is silicone foam. Particularly attractive are flexible foams that are fire proofed, such as flexible polyurethane foam impregnated with sodium silicate.

Also, thixotropic gels can be applied as a flexible substance in the trough. These materials can be poured easily into the trough to make up the seal, and when in the gelled state will not vapourize, or leak from the trough in the event of a leak occuring in the wall of the trough. A suitable substance is a fire proof thixotropic gel such as a sodium silicate based gel.

Graded inorganic powders, such as silica particles of relatively small size, and also interlocking mineral fibres may be applied for making up the flexible seal in the trough.

The invention will now be described in more detail by way of example with reference to the drawings, wherein FIG. 1 shows a vertical section over means for sealing the annular gap between a conductor pipe and a deck portion;

Figure 1:
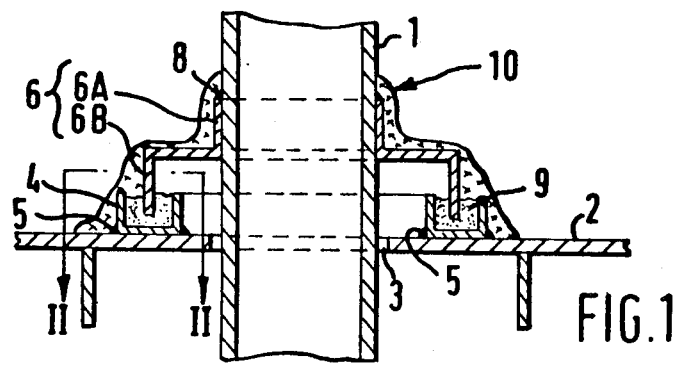

FIG. 1 shows in vertical section part of a conductor pipe that extends from a deck of an offshore platform (not shown) to a level below the bottom (not shown) of the sea where the platform is located. As shown in the drawing, the conductor pipe 1 passes through an opening in the deck 2 that is located at a level below the level of the first deck (not shown). An annular gap 3 is present between the conductor pipe 1 and the deck 2. Since particulars of offshore platforms and the decks thereof are well known and therefore do not need any further description, only that part of the deck 2 is shown in the drawing that is in the immediate neighbourhood of the conductor pipe 1. In the embodiment of the invention shown in FIG. 1, the deck 2 is made of steel.

An annular trough-shaped element 4 is mounted on the deck 2 by welds 5. An annular element 6 with a central collar 6A on top thereof is mounted on the pipe 1 by a weld 8. The skirt 6B of the element 6 is inside the trough 4 and the interior of the trough is filled with silicone foam 9. This silicone foam is an elastic substance that expands when being cured in situ, thereby sealing off against the metal surfaces of the trough 4 and of the lower part of the skirt 6B. A fire resistant layer 10 of "Thermolag 330" (trade mark) marketed by T.S.I. Inc. of Missouri, U.S.A., is trowelled or sprayed over the sealing joint thus formed to give a protection against fire. It will be appreciated that any leaks that may exist in the welds 5 or 8, will be sealed off by the layer 10 that extends from the upper face of the deck 2 onto the side wall of the conductor pipe 1.

Figure 2:
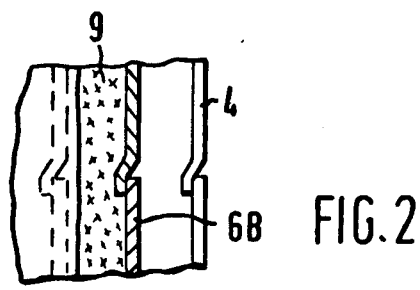
FIG. 2 shows section II—II of the sealing means shown in FIG. 1 on a scale larger than the scale of FIG. 1.

To allow an easy placement of the elements 4 and 6, both elements are made in two complementary ring-sector shaped halves. Section II—II of FIG. 1 is shown in FIG. 2 and presents (on a larger scale than FIG. 1) a detail of one of the two areas where the two halves of each of the elements 4 and 6 meet one another.

The means for sealing off the gap 3 existing between the pipe 1 and the deck 2 is mounted by first placing the two halves of the trough-shaped element 4 on the deck 2 such that they are concentric or approximately concentric to the pipe 1. After welding the parts of the trough-shaped element 4 to the deck 2, the two halves of the element 6 are arranged around the pipe 1 with the collar 6A thereof, such that the lower rim of the skirt 6B is at some distance above the bottom of the trough 4. After welding the collar 6A to the pipe 1, the trough 4 is filled with a mixture of a silicone gum and a foaming agent. The foaming agent generates a gas and the silicone gum vulcanizes, thereby forming an expanded body 9 of silicone foam (such as "RTV" silicone foam marketed by Dow Corning). The expanded body 9 of flexible material seals off against the metal surfaces of the trough 4 and the annular element 6. The material of the body 9 is fire resistant.

In an alternative manner, the silicone foam is placed in the trough prior to placing and welding the element 6. The foam then hardens after the placement of the element 6.

In still another manner, the body of flexible material may be pre-formed outside the trough 4, and subsequently be placed in the trough, whereafter the element 6 is arranged around the conductor string and lowered with the lower end thereof into a pre-formed groove of the body of flexible material. It will be appreciated that the dimensions of the pre-formed body are chosen such that the parts thereof cooperating with the trough and the annular element 6 will seal off against these elements under compression. In an alternative manner, the relevant parts of the body are glued on to the cooperating parts of the trough and the element 6.

Fire resistant layers of Thermolag 330 may be sprayed onto all parts of the sealing means that may come into contact with hot fluids or flames.

Figure 3:
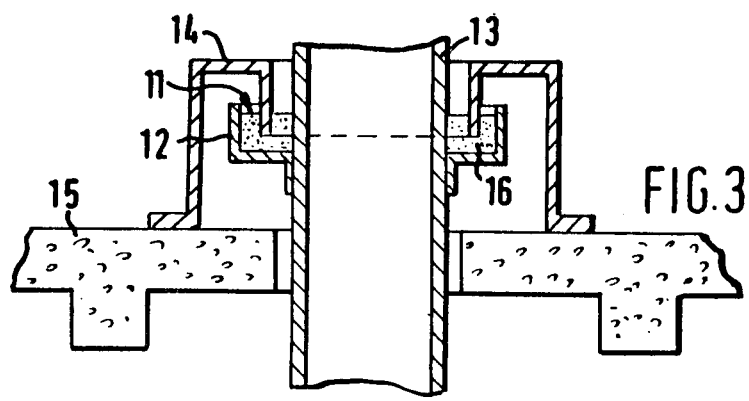
FIG. 3 shows an alternative of the sealing means shown in FIG. 1.

FIG. 3 shows an alternative embodiment of the invention. In the sealing means shown in FIG. 3, the trough 11 is formed by the annular element 12 and the outer wall of the conductor pipe 13. The annular element 12 is maded in two halves that are each glued to the pipe by a suitable fire resistant glue such as "Chromix" (trade name) manufactured by Fortafix Ltd., Peterborough, England. After mounting the annular element 12, the annular element 14 is mounted on the deck 15. The deck 15 is of reinforced concrete and the annular element 14 (that is made in two halves) is glued onto the deck 15 by a suitable fire resistant glue. Thereafter, the trough 11 is filled with a thixotropic liquid, which on gelling forms the flexible seal that prevents the passage of fluids through the trough 11. Optionally, a fire resistant layer (not shown) may be sprayed over the sealing joint to protect all those surfaces thereof that may come into contact with hot gases, vapours, or flames. "Thermolag 330" is a suitable material for this purpose.

The two halves of each of the elements 12 and 14 may be glued to form integral elements. In an alternative manner, the contacting rims of each set of two halves may be formed in the manner shown in FIG. 2 with reference to the elements 4 and 6.

Figure 4:
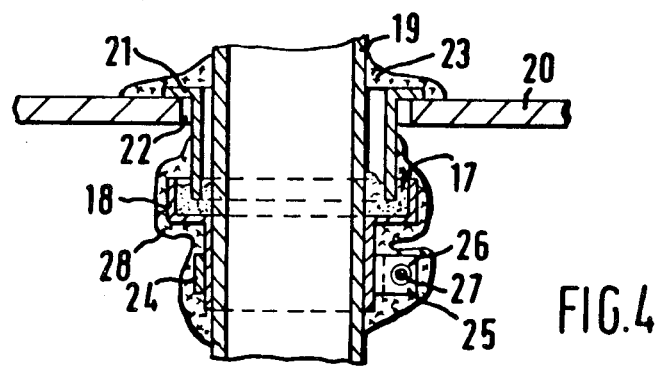
FIG. 4 shows another alternative of the sealing means shown in FIG. 1.

FIG. 4 shows a sealing means according to the invention, which in principle resembles the sealing means shown in FIG. 3. The trough 17 is formed by a first element 18 and part of the outer surface of the conductor pipe 19. The trough is placed below the deck 20, and an annular element 21 that is connected with the horizontal rim thereof to the upper surface of the desk 20 extends downwards through the opening 22 in the deck 20. The lower rim of the annular element 21 is located within the annular trough 17. The trough 17 is filled with a suitable liquid material that by chemical reaction forms a solid body of a flexible substance that adheres to the walls of the trough and to the lower rim of the element 21. Examples of such liquid material are commercial compositions for preparing polyurethane elastomers.

To allow an easy placement of the annular elements 18 and 21, both elements are made in two halves, as described already with reference to FIG. 3. The outer rim of the parts forming the element 21 are glued to the upper face of the deck 20. Preferably, the two halves are glued together after or during placement thereof. In an alternative manner, a sealing agent (not shown) may be applied to the region where the two parts meet. Any fluid leakage that might occur between the rim portion of the element 18 and the deck will be prevented by the presence of the fire resistant layer 23 that gives additional protection to the upper end of the sealing means of FIG. 4.

The annular element 18 is connected to the outer wall of the conductor pipe 19 by means of a clamping ring 24, provided with two end portions 25 with openings 26 through which a bolt 27 passes that can be tightened by a nut (not shown). If desired, a sealing agent (not shown) may be applied between the contacting areas of the annular element 18 and the conductor pipe 19 prior to clamping the element 18 onto the pipe 19. If such sealing agent is not applied, one can rely on the layer 28 of fire resistant material that protects the lower part of the sealing means. This layer will seal off any fluid passages that may exist between the annular element 18 and the pipe 19.

The annular elements 4 and 6 (FIG. 1), 12 and 14 (FIG. 3), and 18 and 21 (FIG. 4) have a central axis of symmetry. However, the sealing means of the present invention may also include non-symmetrical annular elements, as long as those parts thereof enclosing the conductor pipe fit closely to the pipe, and those parts connected to the deck cover a zone of the deck that surrounds the opening through which the pipe passes.

Care should be taken that when forming the flexible substance in-situ, that no gases are formed that might desensitize the catalyst sensor plates of the fire detectors that are present on the offshore platforms. If such gases would result from the chemical reaction carried out to form the flexible substance, these gases should either be sucked off (over a period that might as well extend over a few days), or a molecular sieve such as an activated carbon cloth should be spread over the upper surface of the foam body.

It will be appreciated that the sealing means according to the invention can be quickly and cheaply installed, even without using hot welds to connect the elements thereof to the pipe and the deck. The seal gives an excellent protection against the passage of fluids such as liquids or gases. In particular the sealing means is useful against the passage of noxious and/or flammable gases if such gases are escaping from a gas source and freely flowing over one of the decks. The sealing means prevents the passage of such gases to other decks via openings in the decks, even if the seals are exposed to hot gases. Furthermore, the construction of the sealing means allows a long and useful life, notwithstanding movements that occur between the conductor pipe and the deck portion through which the pipe passes.

Apart from the use of flexible foam, thixotropic liquid or a solid body formed by the chemical reaction of suitable reactants as has been described hereinabove with reference to FIGS. 1, 3 and 4, respectively, any other flexible substance that does not vapourize when in place in the trough of the sealing means may be applied as well, provided that the flexibility of the substance is sufficient to prevent cracking thereof when being subjected to lateral and/or axial displacement of the two annular elements. Such substances may be formed by graded inorganic powders, such as silica particles of a pre-determined size distribution. The body formed by such material is of extremely low permeability and will minimize the passage of gases through the sealing means. Also interlocking mineral fibres will be suitable for this purpose.

The fire resistant coating that is applied to protect the flexible substance and any other parts of the sealing means that may come into contact with hot gases and/or liquids, may be reinforced by armouring material such as glass cloth that is arranged between layers of coating material and/or placed on top of the coating material. This coating will increase the sealing efficiency of the sealing means in that it will cover any tiny passages that might exist at the areas where the annular elements contact the deck and the conductor pipe.

I claim:

1. Offshore platform being provided with a conductor pipe passing through deck portion of the platform, thereby forming a gap in the deck portion around the pipe, wherein means are provided for sealing the gap, said means including a first and a second annular element member arranged around the conductor pipe and connected to the conductor pipe and the deck portion, respectively, one of the annular elements forming at least part of the wall of an annular trough with an open upper end, and the other annular element being arranged to protrude partly into the trough, the trough being filled with a flexible substance.

2. The platform according to claim 1, wherein the trough is formed by the first annular element in conjunction with the conductor pipe.

3. The platform according to claim 1, wherein the trough is formed by the second annular element.

4. The platform according to claim 1, wherein each annular element consists of two complementary ring-sector shaped parts.

5. The platform according to claim 4, wherein the first annular element is clamped around the conductor pipe by means of a clamping ring.

6. The platform according to claim 1, wherein the flexible substance in the trough is a silicone foam.

7. The platform according to claim 1, wherein the flexible substance in the trough is a thixotropic liquid.

8. The platform according to claim 1, wherein the flexible substance in the trough is fire resistant.

9. The platform according to claim 1, wherein at least part of the sealing means is covered with a layer of fire resistant material.

10. The platform according to claim 1, wherein said flexible substance in the trough is non-vaporizing.

11. The platform according to claim 1, wherein said conductor pipe is mounted for non-rotational movement relative to said platform.

12. Sealing means for sealing a cap between an offshore platform deck and a non-rotatable conductor pipe passing through the gap in the deck, comprising:
    an annular trough attached to the platform deck concentric with and having a radius greater than the gap between the pipe and the deck;
    an annular sealing element attached to the conductor pipe and extending partially into said trough; and
    a flexible sealing substance in said trough and sealingly contacting said annular sealing element to provide a seal which prevents fluid that passes through said gap in the platform deck from flowing around said pipe.

13. The sealing means of claim 12 wherein said trough is welded to the deck and said annular sealing means is welded to the conductor pipe.

14. The sealing means of claim 12, wherein said annular trough and said annular sealing element comprise complementary ring segment parts.

15. The sealing means of claim 12, wherein said flexible substance is non-vaporizing.

16. The sealing means of claim 12, wherein said flexible substance is silicone foam.

17. The sealing means of claim 12, wherein said flexible substance is a thixotropic liquid.

18. The sealing means of claim 12, wherein said flexible substance is fire resistant.

19. The sealing means of claim 12, wherein said conductor pipe is mounted for non-rotational movement relative to said platform.

* * * * *